(12) United States Patent
Guan

(10) Patent No.: US 11,374,666 B2
(45) Date of Patent: Jun. 28, 2022

(54) NOISE FLOOR ESTIMATION FOR SIGNAL DETECTION

(71) Applicant: NOKIA TECHNOLOGIES OY, Espoo (FI)

(72) Inventor: Liangrong Guan, Zhejiang (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/972,725

(22) PCT Filed: Jun. 8, 2018

(86) PCT No.: PCT/CN2018/090485
§ 371 (c)(1),
(2) Date: Dec. 7, 2020

(87) PCT Pub. No.: WO2019/232801
PCT Pub. Date: Dec. 12, 2019

(65) Prior Publication Data
US 2021/0258091 A1    Aug. 19, 2021

(51) Int. Cl.
*H04B 17/336*  (2015.01)
*H04W 72/08*  (2009.01)

(52) U.S. Cl.
CPC ........ *H04B 17/336* (2015.01); *H04W 72/082* (2013.01)

(58) Field of Classification Search
CPC .... H04B 17/30; H04B 17/318; H04B 17/336; H04B 17/345; H04B 17/364; H04W 72/082
See application file for complete search history.

(56) References Cited

U.S. PATENT DOCUMENTS

| | | | |
|---|---|---|---|
| 5,742,635 A * | 4/1998 | Sanderford, Jr. | ........ G01S 3/043 342/450 |
| 5,764,686 A * | 6/1998 | Sanderford | ............... G01S 3/50 375/150 |

(Continued)

FOREIGN PATENT DOCUMENTS

| | | |
|---|---|---|
| CN | 101248590 A | 8/2008 |
| CN | 103209006 A | 7/2013 |

(Continued)

OTHER PUBLICATIONS

International Search Report and Written Opinion dated Feb. 28, 2019 corresponding to International Patent Application No. PCT/CN2018/090485.

(Continued)

*Primary Examiner* — James M Perez
(74) *Attorney, Agent, or Firm* — Squire Patton Boggs (US) LLP

(57) ABSTRACT

Embodiments of the present disclosure relate to noise floor estimation for signal detection. In example embodiments, a method is provided. The method comprises transforming a received signal into a real-valued plurality of samples based on a predefined signal sequence; determining respective sample thresholds for the samples; detecting for at least one peak sample and/or at least one valley sample in the plurality of samples by comparing the samples with the respective sample thresholds; determining a noise level for based on remaining samples of the samples other than the at least one detected peak sample and/or the at least one detected valley sample; and detecting matching of one of the plurality of samples with the predefined signal sequence based on the noise level. In this way, a more accurate noise estimate is achieved and thus the performance of the signal detection can be achieved.

18 Claims, 8 Drawing Sheets

(56) References Cited

U.S. PATENT DOCUMENTS

| | | | | |
|---|---|---|---|---|
| 5,953,649 | A * | 9/1999 | Junell | H04B 7/18532 |
| | | | | 370/347 |
| 6,104,996 | A * | 8/2000 | Yin | G10L 19/06 |
| | | | | 704/E19.024 |
| 6,735,242 | B1 * | 5/2004 | Kenney | H04B 1/7085 |
| | | | | 375/150 |
| 7,042,966 | B1 * | 5/2006 | Lapaille | H04B 17/336 |
| | | | | 376/316 |
| 7,366,264 | B2 * | 4/2008 | Henriksson | H03G 3/345 |
| | | | | 375/351 |
| 7,991,084 | B2 * | 8/2011 | Hooli | H04B 1/70755 |
| | | | | 375/325 |
| 8,005,433 | B2 * | 8/2011 | Wigren | H04B 1/7097 |
| | | | | 455/67.11 |
| 8,145,137 | B2 * | 3/2012 | Wigren | H04B 17/26 |
| | | | | 455/67.11 |
| 8,665,910 | B2 * | 3/2014 | Haustein | H04L 5/0007 |
| | | | | 370/324 |
| 8,670,344 | B2 * | 3/2014 | Wigren | H04L 47/10 |
| | | | | 370/252 |
| 9,532,243 | B2 * | 12/2016 | Kim | H04L 27/2614 |
| 9,544,173 | B1 * | 1/2017 | Berardinelli | H04L 27/2636 |
| 9,629,158 | B2 * | 4/2017 | Yu | H04L 25/03159 |
| 9,756,657 | B2 * | 9/2017 | Jiang | H04B 17/345 |
| 9,900,137 | B2 * | 2/2018 | Huang | H04L 5/0053 |
| 10,541,712 | B1 * | 1/2020 | Ayala | H04B 17/345 |
| 10,798,748 | B2 * | 10/2020 | Tavares | H04L 27/26 |
| 10,862,520 | B1 * | 12/2020 | Bloechl | H04B 17/345 |
| 11,082,854 | B2 * | 8/2021 | Marquez | H04B 17/345 |
| 2004/0085891 | A1 * | 5/2004 | Henriksson | H03G 3/345 |
| | | | | 370/316 |
| 2006/0039460 | A1 * | 2/2006 | Fimoff | H04L 25/0226 |
| | | | | 375/232 |
| 2007/0026833 | A1 * | 2/2007 | Kuchi | H04L 27/2649 |
| | | | | 455/296 |
| 2008/0165903 | A1 * | 7/2008 | Hooli | H04B 1/70753 |
| | | | | 375/E1.012 |
| 2008/0227400 | A1 * | 9/2008 | Wigren | H04B 1/7097 |
| | | | | 455/226.2 |
| 2009/0323766 | A1 * | 12/2009 | Wang | H04B 1/7075 |
| | | | | 375/E1.001 |
| 2011/0244809 | A1 * | 10/2011 | Wigren | H04B 17/26 |
| | | | | 455/67.11 |
| 2011/0285545 | A1 * | 11/2011 | Scordilis | A61N 1/37223 |
| | | | | 340/870.07 |
| 2012/0027142 | A1 * | 2/2012 | Essebbar | H04B 1/1027 |
| | | | | 375/350 |
| 2012/0140657 | A1 * | 6/2012 | Wigren | H04L 25/0212 |
| | | | | 370/252 |
| 2013/0035777 | A1 * | 2/2013 | Niemisto | G10L 21/0208 |
| | | | | 700/94 |
| 2013/0136013 | A1 * | 5/2013 | Kneckt | H04W 72/082 |
| | | | | 370/252 |
| 2015/0023329 | A1 * | 1/2015 | Jiang | H04W 74/008 |
| | | | | 370/336 |
| 2015/0208253 | A1 * | 7/2015 | Kim | H04W 24/02 |
| | | | | 370/252 |
| 2015/0215968 | A1 * | 7/2015 | Jiang | H04W 74/004 |
| | | | | 370/328 |
| 2015/0371638 | A1 * | 12/2015 | Ma | G10L 15/02 |
| | | | | 704/275 |
| 2016/0119887 | A1 * | 4/2016 | Charipadi | H04J 13/0062 |
| | | | | 370/335 |
| 2016/0149683 | A1 * | 5/2016 | Huang | H04L 5/0053 |
| | | | | 370/329 |
| 2016/0209493 | A1 * | 7/2016 | Krasner | G01S 5/0215 |
| 2016/0306027 | A1 * | 10/2016 | Chrabieh | G01S 5/06 |
| 2016/0337105 | A1 * | 11/2016 | Lawton | H04L 1/0028 |
| 2016/0359656 | A1 * | 12/2016 | Alloulah | H04L 27/2665 |
| 2017/0222667 | A1 * | 8/2017 | Alkan | H04B 1/0057 |
| 2017/0237484 | A1 * | 8/2017 | Heath | H04B 1/525 |
| | | | | 398/26 |
| 2017/0311307 | A1 * | 10/2017 | Negus | H04W 88/16 |
| 2017/0374683 | A1 * | 12/2017 | Tavares | H04W 28/02 |
| 2018/0102840 | A1 * | 4/2018 | Jiang | H04B 10/07953 |
| 2019/0028187 | A1 * | 1/2019 | Gutman | H04W 52/24 |
| 2019/0200363 | A1 * | 6/2019 | Rajendran | H04W 72/0413 |
| 2021/0099329 | A1 * | 4/2021 | Hellfajer | H04L 1/20 |
| 2021/0184736 | A1 * | 6/2021 | Da Silveira | H04L 5/0023 |
| 2021/0258091 | A1 * | 8/2021 | Guan | H04B 17/336 |

FOREIGN PATENT DOCUMENTS

| | | |
|---|---|---|
| CN | 104796908 A | 7/2015 |
| CN | 104935532 A | 9/2015 |
| CN | 105321528 A | 2/2016 |

OTHER PUBLICATIONS

First Examination Report dated Sep. 9, 2021 corresponding to Indian Patent Application No. 202047054780.

Extended European Search Report dated Dec. 13, 2021 corresponding to European Patent Application No. 18921877.9.

First Office Action dated Oct. 19, 2021 corresponding to Chinese Patent Application No. 201880096421.5.

\* cited by examiner

NOISE FLOOR ESTIMATION FOR SIGNAL DETECTION

FIELD

Embodiments of the present disclosure generally relate to the field of signal detection and in particular, to noise floor estimation for signal detection.

BACKGROUND

In a wireless communication system, devices, such as a network device (such as a base station (BS)) and a terminal device or two terminal devices may communicate with each other by sending signals. In some cases, a receiving device may receive the signal from more than one other device and may have to identify from the received signal whether a signal sample is received from one of the devices. The receiving device may detect whether the received signal match with one or more of a set of predefined signals so as to determine if whether the other devices send the signal. However, due to the noise floor in communication channels between the devices as well as the interferences occurred for simultaneous transmission, only samples above a threshold are valid samples for the signal detection. The threshold used for signal detection is generally set according to a noise level in the received signal. The higher the noise level is in the received signal, the higher the threshold is set. As such, the noise floor estimation is an important task in signal detection.

SUMMARY

In general, example embodiments of the present disclosure provide a solution for noise floor estimation for signal detection.

In a first aspect, there is provided a method. The method comprises transforming a received signal into a plurality of samples based on a predefined signal sequence, the plurality samples being real-valued samples; determining respective sample thresholds for the plurality of samples; detecting for at least one peak sample and/or at least one valley sample in the plurality of samples by comparing the plurality of samples with the respective sample thresholds; determining a noise level based on remaining samples of the plurality of samples other than the at least one detected peak sample and/or the at least one detected valley sample; and detecting matching of one of the plurality of samples with the predefined signal sequence based on the noise level.

In a second aspect, there is provided a device. The device comprises at least one processor; and at least one memory including computer program code; the at least one memory and the computer program code configured to, with the at least one processor, cause the device to perform acts comprising: transforming a received signal into a plurality of samples based on a predefined signal sequence, the plurality samples being real-valued samples; determining respective sample thresholds for the plurality of samples; detecting for at least one peak sample and/or at least one valley sample in the plurality of samples by comparing the plurality of samples with the respective sample thresholds; determining a noise level based on remaining samples of the plurality of samples other than the at least one detected peak sample and/or the at least one detected valley sample; and detecting matching of one of the plurality of samples with the predefined signal sequence based on the noise level.

In a third aspect, there is provided a computer readable storage medium that stores a computer program thereon. The computer program, when executed by a processor, causes the processor to perform the method according to the first aspect.

In a fourth aspect, there is provided a computer program product. The computer program product is tangibly stored on a computer program and comprises a computer program, the computer program, when executed by a processor, causing the processor to perform the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
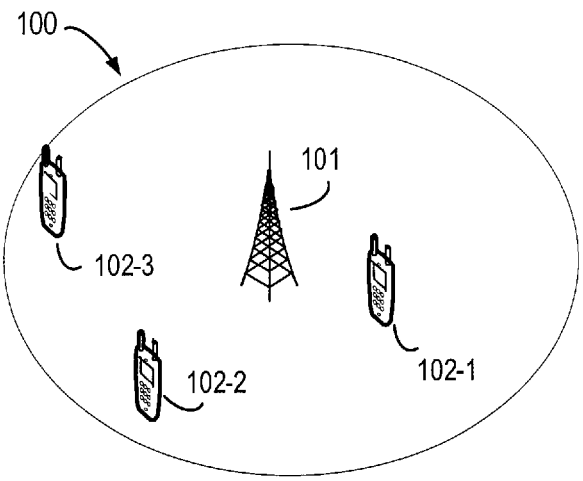
FIG. 1 illustrates an example wireless communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network device" refers to a node in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (JOT) scenario, a terminal device may represent a machine or other device that performs monitoring and/or measurement, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink (DL) transmission refers to a transmission from a network device to UE, and an uplink (UL) transmission refers to a transmission in an opposite direction. That is, in DL, the network device is a transmitter and the UE is a receiver device; while in UL, the UE is a transmitter and the network device is a receiver device.

FIG. 1 illustrates an example wireless communication network 100 in which embodiments of the present disclosure may be implemented. As shown, the wireless communication network 100 may include one or more devices, for example, a device 101, 102-1, 102-2, and 102-3. In the example of FIG. 1, the device 101 is illustrated as a network device, which may be in a form of a base station (BS), a Node B (NB), an evolved NB (eNB), a gNB, a virtual BS, a Base Transceiver Station (BTS), or a Base Station Subsystem (BSS), AP and the like. The devices 102-1, 102-2, and 102-3 are illustrated as terminal devices (or UEs), which are collectively referred to as "terminal device (s) 102."

In communication, the device 101 receives a signal/signal(s) transmitted from one or more of devices 102. In some embodiments, the device 101 may also be referred to as a receiver device, and the devices 102 may also be referred as a transmitter device. It should be appreciated that in some embodiments, the network device may provide service to less or more terminal devices and the number of terminal devices in this shown example does not suggest any limitations as to the scope of the present disclosure. In some embodiments, a network device, e.g., the network device 101 in FIG. 1, may serve terminal devices, e.g., a terminal device 102 in FIG. 1, within its coverage with a plurality of antennas. For example, the network device 101 may be equipped with a plurality of transmitting antennas, and/or a plurality of receiving antennas. Likewise, in some embodiments, some or all of the Terminal devices 102 may be equipped with a plurality of antennas for transmitting and/or receiving. In addition, a plurality of Terminal devices 102 may be scheduled to transmit or receive in a same or overlapped time-frequency resource, thereby forming a multi-user MIMO (MU-MIMO) scheme. Therefore, in some scenarios, a receiver device (which may be a network device or a UE) may be required to detect signals transmitted from a plurality of antennas.

When receiving the signal, the network device 101 may detect whether the received signal matches with one or more of predefined signal sequences. One of such for signal detection is a random access procedure between the network device 101 and the terminal device 102. Generally, random access allows the network device 101 to estimate and adjust uplink transmission timing of the terminal device 102 to within a fraction of the cyclic prefix. When the network device 101 successfully receives a random-access preamble, it sends a random-access response indicating an identity (ID) of the successfully received preamble (referred to as the preamble ID) along with the timing advance (TA) and uplink resource allocation information to the terminal device 102. If the preamble ID matches to what the terminal device 102 sends, the terminal device 102 will assume its preamble has been identified by the network device 101 successfully and will use the received TA to adjust its uplink timing and acquire the synchronization. A random access preamble (also referred to as a random assess signal or a Physical Random Access Channel (PRACH) signature) may be generated from a Zadoff-Chu (ZC) sequence, which satisfies the Constant Amplitude Zero Autocorrelation (CAZAC) property. The cyclic shift offset is dimensioned so that the Zero Correlation Zone (ZCZ) of the sequences ensures the orthogonality of the PRACH sequences regardless of the delay spread and time uncertainty of the Terminal devices 102.

In order to detect whether the received signal match with a ZC sequence, the network device 101 transforms the received signal from time-domain complex-value samples into real-value power delay profile (PDP) samples. Signal sequence detection and time offset estimation are performed based on the PDP samples. Generally, due to the noise in communication channels between the devices as well as the interferences occurred for simultaneous transmission, only samples above a threshold are valid samples for the signal detection. The threshold used for signal detection is generally set according to a noise level in the received signal. The higher the noise level is in the received signal, the higher the threshold is set. Therefore, in order to perform the signal detection, a noise level in the received signal is first detected, and then used to determine a threshold to detect the PDP samples above that threshold as matching with a predefined signal sequence. The noise existing in the received signal may also be referred to as a noise floor.

In view of the above, the noise floor detection is an important task in signal detection. If the noise level is under estimated, a lower threshold is set and then too many invalid PDP samples will be selected for signal detection, which will lead to a false detection. If the noise level is overestimated, a higher threshold is set and then some valid PDP samples will be excluded for the signal detection, which will lead to miss detection of the target signal.

Figure 2:
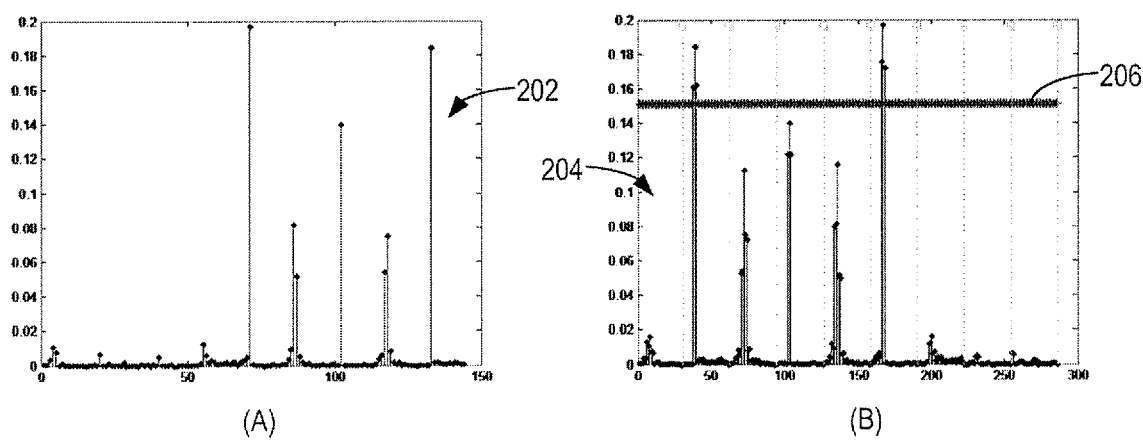
FIG. 2 illustrates an example where a high noise level estimate results in miss detection of signals.

FIG. 2 illustrates an example where a high noise level estimate results in miss detection of signals. Graph (A) in FIG. 2 shows a sequence of PDP samples 202 transformed from the received signal. The sequence of PDP samples 202 may be processed to be a sequence of PDP samples 204 and the PDP samples 202 can be compared with a noise-based threshold 206 to determine valid samples, as shown in graph (B) in FIG. 2. In graphs (A) and (B), the horizontal axis represents the index of PDP samples and the vertical axis represents the magnitude of PDP samples. It is noted that the number of PDP samples is doubled in graph (B) due to interpolation operation on the sequence of PDP sample 202. The interpolation operation is performed for improvement of TA resolution. In the graph B, the PDP sample above the noise-based threshold 206 are detected as the valid sample for signal detection. However, due to the very high noise level estimate, the threshold 206 is set as a high value and thus three PDP samples are missed while in fact there are in total five preambles transmitted.

It would be appreciated that although the detection of PRACH signature is described above, the receiving device such as the network device may also detect other types of signal sequence from the received signal, such as in communication of reference signals as well as other signals. It would also be appreciated that although a communication system for network devices and terminal devices is illustrated in FIG. 1, in other use cases, the signal detection may also be required in other communication systems such as peer-to-peer communication systems. In these use cases, the signal detection may be performed in the peer-to-peer device (a terminal device), instead of the network device.

There are some conventional schemes for noise floor estimate, especially for PRACH signature detection. In a first scheme, a cluster detection window is defined to include multi-path of the signal. PRACH signature is detected by sweeping the cluster detection window in PDP samples of the signal. Within the cluster detection window, the PDP peaks are accumulated and the timing of the maximum peak is used as the tentative arrival timing. A noise level is measured from the remaining PDP samples, but the samples within the cluster detection window are not used. An arrival signal detection threshold (referred to as Threshold A) is set as the calculated noise level plus an offset value. PDP samples larger than Threshold A within the cluster detection window are accumulated as received signals. The accumulated signal power is compared to a detection threshold (referred to as Threshold B), which is determined from the calculated noise level plus an offset value. The offset value can be adjusted to achieve a false alarm probability of 0.1%. If the accumulated signal power is larger than Threshold B, it is identified as valid samples for signal detection, or it is identified as a false alarm if the signature is not transmitted. In addition, the peak power of the PDPs in the cluster detection window is detected as arrival timing, used for determining the timing advance.

One difficulty in this scheme is to set the offset value for Threshold A/B to guarantee the false alarm probability. Generally the offset value is set as the absolute deviation from the calculated noise level, which may not be desirable all the times. Another difficulty lies in how to exclude the impact of the PDP peaks as completely as possible when estimating the noise level. Due to these difficulties, it is impossible to estimate an accurate noise level for the signal detection according to this scheme.

Another conventional scheme for noise level estimation is to set the noise level by calculating the mean value of all samples of the PDP samples and multiplying the calculated mean by a constant value. The constant value can be determined by theoretical calculation assuming the absence of preamble transmission in an additive white Gaussian noise (AWGN) channel with uncorrelated Gaussian noise. In case many preambles present in the received signal, the noise level may be highly overestimated, and then the detection threshold will be set too high and many miss detections may happen.

One possible way to get a better approximation of the actual noise level in the conventional schemes is to discard peaks higher than a predefined level before the mean calculation; thus a little more accurate threshold value can be achieved. More specifically, a mean value of all PDP samples may be first calculated as below:

$$m_s = \frac{1}{N_{IFFT}} \sum_{i=0}^{N_{IFFT}-1} z_{nca}(i) \quad (1)$$

where $m_s$ is mean value of all samples, $N_{IFFT}$ is the number of all PDP samples after transformation and $z_{nca}(i)$ is the PDP sample which is non-coherently accumulated over number of diversity antennas $N_a$ and additional sequence repetitions $N_{nca}$, which may be represented as below:

$$z_{nca}(i) = \sum_{a=1}^{N_a} \sum_{m=0}^{N_{nca}-1} |z_a^m(i)|^2 \quad (2)$$

Then, the noise level estimate is achieved by re-calculating the mean value from those samples that are smaller than a threshold $T_A$ (Threshold A), which may be represented as below:

$$\lambda_w = \frac{1}{N_S} \sum_{i=0}^{N_{IFFT}-1} (z_{nca}(i) < T_A), T_A = A_{factor} \cdot m_s \quad (3)$$

where $\lambda_w := N_a N_{nca} \sigma_n^2$ is the estimated noise level and $N_s$ is the number of samples that fulfill the condition of $(z_{nca}(i) < T_A)$. $A_{factor}$ can be simply set to 1 or theoretically derived based on AWGN. It is well known that for a zero-mean complex AWGN the power envelope follows a central chi-square distribution. The n degrees of freedom are determined by how many Gaussian random variables are summed together. For complex signals, $n=2N_a N_{nca}$. After the antenna and sequence combining, $A_{factor}$ can be determined as:

$$A_{factor} = \frac{1}{n} \chi_{-1}^2 \left( (1 - P_{targetFA}/N_{totPrm})^{\frac{1}{L}}, n \right) \quad (4)$$

where $P_{targetFA}$ is the target setting for the false alarm rate, L is number of samples in a preamble uncertainty search window, $N_{totPrm}$ is the number of total available preamble resources on the root sequences, and $\chi_{-1}^2$ is an Inverse-chi-squared function with n degrees of freedom.

Finally, another threshold (Threshold B) for signal detection can be calculated as:

$$T_B = \lambda_w \cdot T_r \quad (5)$$

where $T_r$ is a threshold constant by applying the above theoretical criteria, which can be adjusted according to the correct false alarm level.

This above optimized scheme utilizes the relative thresholds instead of the absolute thresholds to detect the preambles, which avoids the laborious work to solve the Cumulative Distribution Function (CDF) function as in other conventional schemes, and thus the dependency of CDF on the noise variance is removed. However, the selection of a proper $A_{factor}$ is still of difficulty. It has been proposed to use a factor of 1 for the noise level estimation. But it is proved that too much small noise power will be derived in some scenarios due to the exclusion of too many PDP samples and leads to the false alarm rate beyond the target.

Another proposal is to use the theoretical calculation of $A_{factor}$ based on AWGN assumption, but in case there are many preambles present in the received signal, $m_s$ in may be estimated far above the true noise level such that some peaks cannot be excluded in the noise estimation and finally results in many miss detections due to high threshold.

In view of the above, the most important task in signal detection is to estimate the noise floor precisely, which serves as the basis of signal detection and guarantees the detection performance. Embodiments of the present disclosure provide a scheme of more accurate noise floor estimation for signal detection. In the scheme of the present disclosure, instead of calculating a noise level by discarding peak samples higher than a predefined level or averaging all samples with exclusion of the samples in cluster detection windows, a new method is proposed to detect for at least one peak sample and/or at least one valley sample from the samples, and then a noise level for a predefined signal sequence is determined based on remaining samples other than the at least one detected peak sample and/or the at least one detected valley sample. The peak sample and/or the valley sample can be detected by comparing the samples with respective sample thresholds determined for the corresponding samples. The noise level is used in detecting matching of one of the plurality of samples with the predefined signal sequence based on the noise level. In this way, a more accurate noise estimate is achieved and thus the performance of the signal detection can be achieved.

Figure 3:
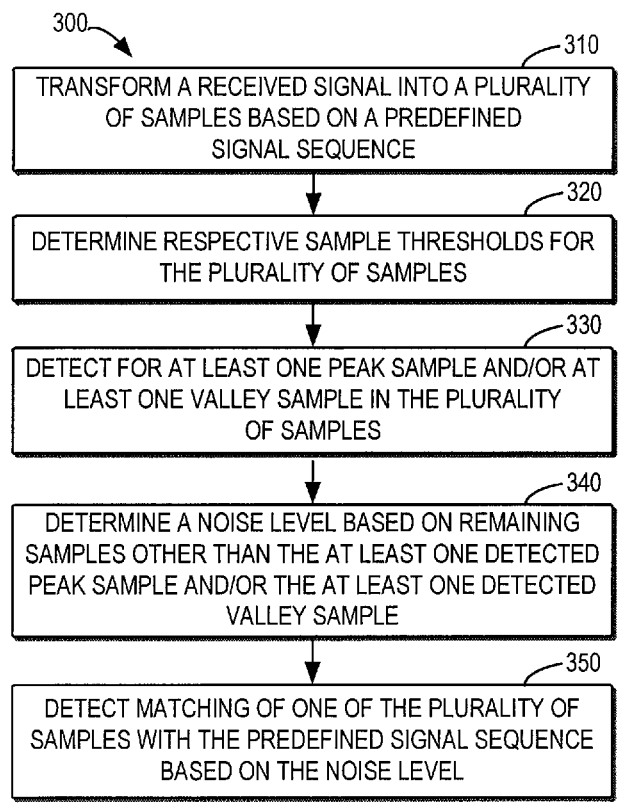
FIG. 3 illustrates a flowchart of a method according to embodiments of the present disclosure.

FIG. 3 illustrates a flowchart of a method 300 according to embodiments of the present disclosure. The method 300 can be implemented by the network device 101 in the network 100 of FIG. 1 or any other device that performs signal detection on a received signal. For purpose of discussion, the method 300 is described with reference to FIG. 1.

At block 310, the network device 101 transforms a received signal into a plurality of samples based on a predefined signal sequence. The predefined signal sequence is the one that is used by a device to generate a signal or a signal sequence to be transmitted. The signal sequence is known by both the receiving and sending side. Upon receiving a signal in a certain channel, the network device 101 will detect whether the signal contains information (such as one or more samples) generated from the predefined signal sequence. In some cases, the predefined signal sequence may be a root sequence or a cyclic-shifted version of a root sequence. In some embodiments, there may be more than one predefined signal sequence is in use. In this case, different terminal devices 102 at the sending side may transmit a sequence generated from different predefined signal sequences. The network device 101 then may have to determine whether the received signal includes one or more samples generated from one or more of the predefined signal sequences.

One example of a predefined signal sequence is a Zadoff-Chu (ZC) sequence. Different ZC sequences may be designed to satisfy the Constant Amplitude Zero Autocorrelation (CAZAC) property. A terminal device 102 may transmit a cyclic shifted version of a ZC sequence to the network device 101. The cyclic shift offsets used by different terminal devices 102 may also be dimensioned so that the Zero Correlation Zone (ZCZ) of the sequences ensures the orthogonality of the transmitting sequences regardless of the delay spread and time uncertainty of the terminal devices 102.

In some other examples, other signal sequences with the CAZAC-like property may also be used as long as the received signal can be transformed into real-valued samples. For example, a PRACH signal can be replaced by any signal with a zero autocorrelation and a low cross-correlation property, for which a PDP sample of the received sequence is defined as $$PDP(l) = |z_u(l)|^2 = \left| \sum_{n=0}^{N_{ZC}-1} y(n)x_u^*((n+l)_{N_{ZC}}) \right|^2 = |(y(n) * x_u^*(-n))(l)|^2 \quad (6)$$

where $z_u(l)$ is a discrete periodic correlation function at a lag l of the received signal $y(n)$ and a reference searched ZC sequence $x_u(n)$ with a length $N_{ZC}$.

The received signal may be a combination of signals simultaneously transmitted from one or more terminal devices 102 which may be generated based on one or more of the predefined signal sequences. The transforming of the received signal is dependent on the processing for signal reception in the network device 101. In some embodiments, to perform the subsequent signal matching, the plurality of samples are transformed from the received signal to have real-valued magnitudes. The network device 101 may select one of the predefined signal sequences to transform the received signal so as to detect whether there is any sample in the signal generated from this predefined signal sequence.

Depending on the predefine signal sequence, the transformed samples may be different. In some embodiments, the received signal may be transformed into a power domain according to any suitable signal transformation techniques. For example, the plurality of samples may be calculated by a frequency-domain periodic correlation on the received signal and an Equal Gain Combination over the diversity antennas. Generally, the received signal may be a time-domain signal, and thus at least a time-frequency transformation (such as Discrete Fourier Transform (DFT)) may be performed on the received signal to obtain the samples. In some embodiment, the plurality of samples may be transformed as real-valued power delay profile (PDP) samples. The plurality of samples may be indexed in a sequence.

At block 320, the network device 101 determines respective sample thresholds for the plurality of samples. Then at block 330, the network device detects for at least one peak sample and/or at least one valley sample in the plurality of samples by comparing the plurality of samples with the respective sample thresholds. A peak/valley sample is the one having a significant magnitude as compared to samples from noise floor. The samples other than the peak and valley sample(s) may be referred to as noise samples. In signal transmission, if there is a valid sample/preamble is transmitted, the magnitude of the sample/preamble is significantly different from that of the noise. According to embodiments of the present disclosure, it is desired to detect whether the plurality of samples comprise a peak sample(s) and/or a valley sample(s) first so as to exclude the detected sample(s) from the noise level estimation because the detected sample(s) cannot possibly be noise.

In order to detect whether one of the plurality of samples is a peak/valley sample, a sample threshold is dynamically determined for that sample. The sample (i.e., the magnitude of the sample) is compared with the sample threshold to determine whether this sample is a peak sample, a valley sample, or a noise sample. Depending on the actual cases, one or more peak samples and/or one or more valley samples may be detected from the plurality of samples. The determination of the sample thresholds and the detection of the peak/valley sample(s) will be described below in detail.

At block 340, the network device 101 determines a noise level based on remaining samples of the plurality of samples other than the at least one detected peak sample and/or the at least one detected valley sample at block 330. The noise level indicates the noise power in the received signal or the plurality of samples transformed based on the predefined signal sequence. The noise may be occurred due to the noise in the communication channel and/or interferences from various sources. By excluding the peak sample(s) and/or valley sample(s) from the noise estimation, it is possible to improve the accuracy of the estimated noise level. In some embodiments, if no peak or valley sample is detected in the plurality of samples, the network device 101 may determine the noise level based on all the plurality of samples.

In some embodiments, the noise level may be determined by averaging the remaining samples other than the peak and/or valley sample(s). This is very suitable for the case that only one possible signal sequence is defined between the network device 101 and the terminal device 102. In some other embodiments, if more than one predefined signal sequence is used, there is a potential inter-sequence interference occurred if the plurality of samples includes samples generated from different signal sequences. Such inter-sequence interference is considered as noise in the plurality of samples. Thus, in some embodiments, the noise level for a predefined signal sequence is determined further based on at least partially cancellation of the inter-sequence interference, which will be described below in detail. In this way, different noise levels may be determined for different predefined signal sequences.

At block 350, the network device 101 detects matching of one of the plurality of samples with the predefined signal sequence based on the noise level. It would be appreciated that the use of the noise level in the signal detection can be varied according to different signal detection techniques to be adopted. In some embodiments, the network device 101 may determine a detection threshold based on the noise level and then detect whether one of the plurality of samples matches with the predefined signal sequence by comparing the sample with the detection threshold. In some embodiments, the higher the noise level is determined, the higher the detection threshold is set. For example, the detection threshold may be set based on weighting the noise level with a predetermined factor (which may have a fixed value or a dynamic value).

Generally, if one of the samples is detected as higher than the detection threshold, this sample may be identified as a valid sample for the predefined signal sequence. The valid sample(s) may be further processed (such as collision detection in a same detection window) to determine if the sample matches with the current signal sequence. If the detecting result indicates that one of the plurality of samples matches with the signal sequence, the network device 101 may perform further operations as configured or required. The scope of the present disclosure is not limited in this regard.

By way of example, in the case of PRACH transmission, if the network device 101 determines a PRACH signature (a sample) in the received signal, the network device 101 may provide the ID of the PRACH signature (probably together with information on a timing offset determined in the signal detection) for the upper layer. The upper layer may inform the terminal device 102 of the ID of the PRACH signature and probably the timing advance.

Figure 4:
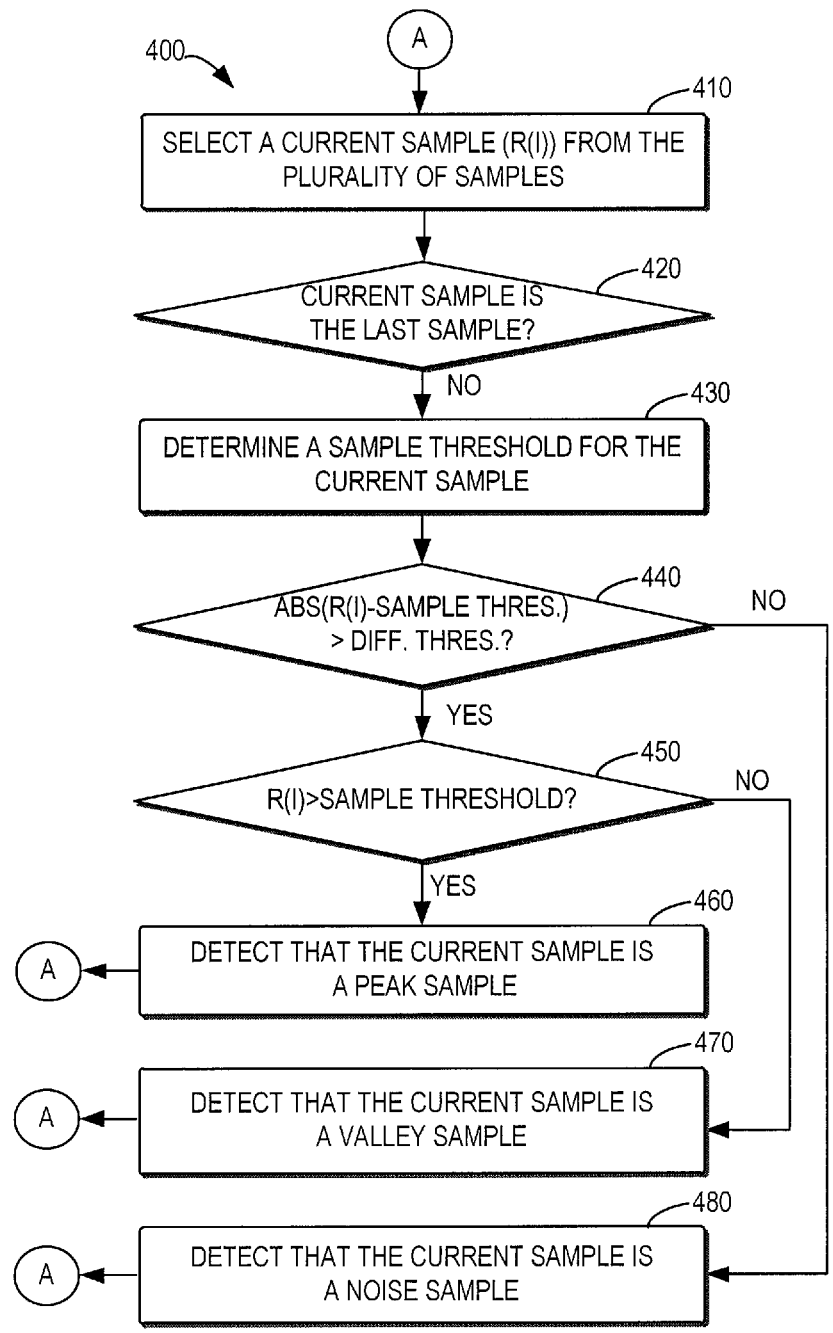
FIG. 4 illustrates a flowchart of a method of detecting a peak sample and/or a valley sample according to embodiments of the present disclosure.

FIG. 4 illustrates a flowchart of a method of detecting a peak sample and/or a valley sample 400 according to embodiments of the present disclosure. The method 400 may be considered as an example embodiment for blocks 320 and 330 in the method 300. The method 400 can be implemented by the network device 101 in the network 100 of FIG. 1 or any other device that performs signal detection on a received signal. For purpose of discussion, the method 400 is described with reference to FIG. 1. The network device 101 determines whether each of the plurality of samples is a peak sample, a valley sample, or a noise sample.

The network device 101 selects a sample from the plurality of samples as a current sample at block 410 and determines whether the current sample is a last sample of the plurality of samples at block 420. The network device 101 may select the sample according to the indices of the plurality of samples. For example, the first sample in the plurality of samples can be first selected. Of course, the selecting order will not impact the determination of the sample threshold and the subsequent peak/valley/noise sample determination. The current sample may be represented as R(i).

At block 430, the network device 101 determines a sample threshold for the current sample RN. In some embodiments, the network device 101 determines the sample threshold by averaging a predetermined number of samples before the current samples. That is to say, the determination of the sample threshold is based on a circular convolution method. The predetermined number of samples may be selected by using a window with a predetermined length to slide along the transformed samples. The predetermined number or the length of the window may be preconfigured, for example, according to the width of the peak sample or the valley sample. For example, the predetermined number may be configured as 5, 3, 7, or the like. The determined sample threshold may also be referred to as a smoothed mean for the current sample R(i).

To perform the circular convolutional determination of the sample threshold, in some embodiments, copies of the predetermined number of samples among the plurality of samples may be padded to the beginning of the sequence. In an embodiment, the predetermined number of samples in the end of the sequence of the samples (the last predetermined number of samples) may be padded to the beginning of the sequence. In this way, for the first sample among the plurality of samples, its sample threshold may be determined by averaging the padded predetermined number of samples before this first sample. Likewise, for the second sample among the plurality of samples, its sample threshold may be determined by averaging the first sample and other samples padded before the second sample.

In some embodiments, in determining the sample threshold for the current sample R(i) by means of averaging, if one of the predetermined number of samples is detected as a peak sample or a valley sample, which indicates that this sample is significantly different from the noise samples, this sample may be smoothed based on at least one previous sample. That is to say, the magnitude of the peak or valley sample is smoothed to obtain a smoothed magnitude. Then the smoothed peak or valley sample is averaged with the other samples to determine the sample threshold. In some embodiments, the smoothing of the peak or valley sample in the predetermined number of samples may be performed by determining a weighted sum of this sample and at least one sample before this sample (such as a previous adjacent sample). The sample threshold for the current sample may be determined by averaging the smoothed peak or valley sample and remaining samples of the predetermined number of samples other than that peak or valley sample. For those samples that are detected as noise samples, their actual magnitudes can be used for the averaging.

In some embodiments, it is supposed that a peak or valley sample in the predetermined number of samples is represented as R(j) (which also represents the magnitude of this sample), the smoothed magnitude for the sample R(j) may be determined by weighting the sample R(j) and its adjacent sample (such as its previous sample R(j−1)). The smoothed magnitude of the sample R(j) may be represented as filteredR(j). In some embodiments, each of the predetermined number of samples may be smoothed to obtain its smoothed magnitude. The smoothed magnitude of the previous sample R(j−1) may be represented as filteredR(j−1). As mentioned above, if a sample is a noise sample (not a peak or valley sample), its magnitude remains unchanged, that is, filteredR(j)=R(j). If it is supposed that a weighting factor (referred to as a) is used in weighting the sample R(j), then the smoothed magnitude of the sample R(j) may be determined by means of weighting as: filteredR(j)=αR(j)+(1−α)filteredR(j−1). In this way, the smoothing results propagate from the previous samples and are continued to be used in smoothing the following samples.

In some embodiments, the weighted factor α is defined as what weighting factor the peak or valley sample in the predetermined number of samples contributes to the sample threshold of the current sample. The weighting factor may be preconfigured as any value that is in a range between 0 to 1. It is noted that if two or more peak or valley samples are detected in the predetermined number of samples, their smoothed magnitudes (smoothed magnitudes) can be determined in a similar manner. The smoothed samples are averaged to determine the sample threshold.

At block 440, the network device 101 compares a difference between the current sample (R(i)) and the sample threshold determined for the current sample with a difference threshold to determine whether the difference is above the difference threshold. The difference between the current sample (R(i)) and the sample threshold is calculated by an absolute value of the current sample (i.e., the magnitude of the current sample) minus the sample threshold, represented as abs(R(i)-sample threshold).

The difference threshold is defined as to what extent the peak sample or valley sample exceeds the smoothed mean (i.e., the sample threshold). In some embodiments, the difference threshold may be preconfigured as any values. In some embodiments, the difference threshold used for the current sample may be determined according to a degree of deviation of the predetermined number of samples before the current sample. More particularly, the difference threshold may be calculated by multiplying the degree of deviation by a predetermined factor. The predetermined factor may be preconfigured as any values. The degree of deviation indicates the degree of the sample deviated from the smoothed mean, and may be determined as a standard deviation of the predetermined number of samples before the current sample in some examples. In some embodiments, similar to the averaging of the predetermined number of samples discussed above, the smoothed magnitudes of the predetermined samples may be used to calculate the standard deviation, instead of the actual magnitudes of the samples.

If the difference is above the sample threshold, which means that the current sample exceeds the smoothed mean of the neighboring samples to a large extent, the network device 101 may determine that this sample might be a potential peak or valley sample and then at block 450, the network device 101 determines whether the current sample (i.e., the magnitude of the current sample) is above the sample threshold. If the network device 101 determines that the current sample is above the sample threshold (i.e., the current sample is significantly higher than the smoothed mean of the neighboring samples), then the current sample is detected as a peak sample at block 460. If the network device 101 determines that the current sample is below the sample threshold (i.e., the current sample is significantly lower than the smoothed mean of the neighboring samples), then the current sample is detected as a valley sample at block 470.

If the network device 101 determines that the difference is not above the sample threshold (i.e., abs(R(i)-sample threshold) is less than or equal to the difference threshold) at block 440, the network device 101 detects that the current sample is a noise sample at block 480. That is to say, those samples other than the peak sample or valley samples are all potential noise samples. It would be appreciated that block 480 may be omitted and the noise samples in the plurality of samples of the received signal may be detected by discarding the peak and/or valley sample(s) detected at blocks 460 and 470.

After determining whether the current sample is a peak sample, a valley sample or a noise sample at block 460, 470, or 480, the network device 101 returns to block 410 to select another sample from the plurality of samples as a current sample. In some embodiments, the network device 101 may store the index of the current sample which is identified as a peak sample or a valley sample.

Through the method 400, it is possible to detect one or more peak samples and/or valley samples from the plurality of samples of the received signal. As mentioned above in the method 300, the noise level may be determined by discarding the peak and/or valley samples and calculated based on the remaining samples (i.e., noise samples) only. In the case of only one predefined signal sequence is used in the communication system, the noise level may be calculated by averaging the noise samples.

Figure 5:
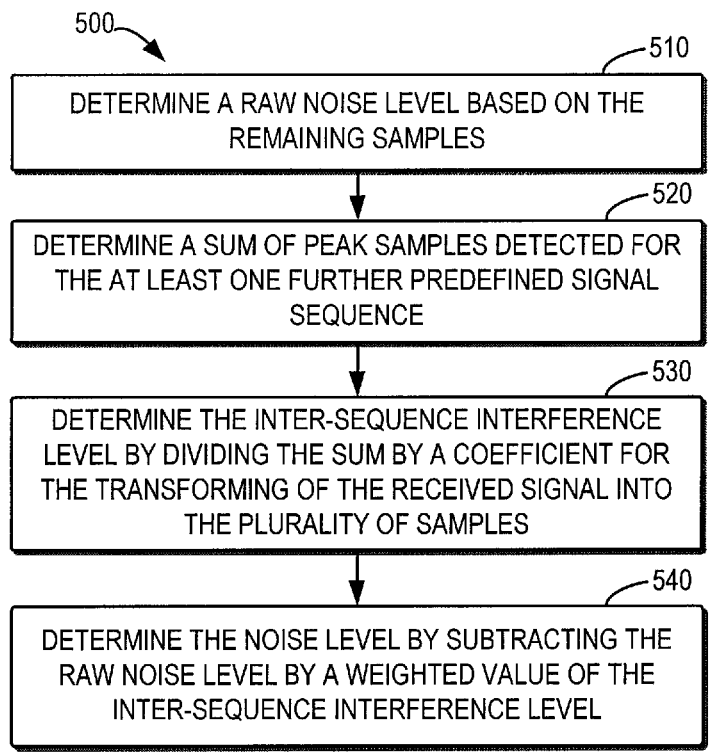
FIG. 5 illustrates a flowchart of a method of determining a noise level according to embodiments of the present disclosure.

In the case of more than one predefined signal sequence is used, the inter-sequence interference can be taken into account when determining the noise level. FIG. 5 illustrates a flowchart of a method of determining a noise level 500 in the case of taking inter-sequence interference into account according to embodiments of the present disclosure. The method 500 may be considered as an example embodiment for blocks 340 in the method 300. The method 500 can be implemented by the network device 101 in the network 100 of FIG. 1 or any other device that performs signal detection on a received signal. For purpose of discussion, the method 500 is described with reference to FIG. 1. The network device 101 determines the noise level for each of the predefined signal sequences that are potentially used by the terminal device(s) 102 that sends a signal. Each predefined signal sequence that is under consideration may be referred to as a current predefined signal sequence below.

At block 510, the network device 101 determines a raw noise level based on the remaining samples. The remaining samples are the noise samples in the plurality of samples other than the peak and/or valley samples. The raw noise level may be considered as an intra-sequence noise level without considering inter-sequence interference with other signal sequence. In some embodiments, the raw noise level may be determined in a similar manner as determining a noise level when only one signal sequence is taken into account, for example, by averaging the remaining samples. By way of example, the raw noise level may be calculated as a mean of the remaining samples. In some alternative examples, the raw noise level may be determined by multiplying the mean of the remaining samples by a predetermined factor or by averaging weighted values of the remaining samples. It would be appreciated that in other embodiments, the raw noise level may be determined on the basis of the remaining samples in other manners than by way of averaging, and the scope of the present disclosure is not limited in this regard.

Then the network device 101 may determine an inter-sequence interference level between the current predefined signal sequence and one or more other predefined signal sequences so as to cancel the inter-sequence interference from the raw noise level to obtain a more accurate noise level for the current predefined signal sequence. In order to determine the inter-sequence interference, at block 520, the network device 101 determines a sum of peak samples detected for the at least one further predefined signal sequence. For each of the further predefined signal sequence(s), the network device 101 may detect the peak samples from a plurality of samples transformed based on the further predefined signal sequence in a similar manner as for the current predefined signal sequence. The detailed description is omitted here for brevity.

The network device 101 may determine the inter-sequence interference level based on the sum. Specifically, at block 530, the network device 101 determines the inter-sequence interference level by dividing the sum by a coefficient for the transforming of the received signal into the plurality of samples. The coefficient in some examples may be a size of the time-frequency transformation, such as the size for an Inverse Discrete Fourier Transform (IDFT).

It would be appreciated that blocks 520 and 530 provides an example embodiment for determining the inter-sequence interference between the current predefined signal sequence and other predefined signal sequences. In other embodiments, the inter-sequence interference may be measured using other techniques and the scope of the present disclosure is not limited in this regard.

The network device 101 determines the noise level for the current predefined signal sequence based on the raw noise level and the inter-sequence interference. Specifically, at block 540, the network device 101 determines the noise level by subtracting the raw noise level by a weighted value of the inter-sequence interference. For example, the inter-sequence interference may be weighted by a predetermined factor, which is used to define to what extent the inter-sequence interferences from other signal sequences will be deducted. The predefined factor may be preconfigured as any values, such as 0.5, 0.6, 0.7, or the like. The noise level may then be determined by subtracting the weighted inter-sequence interference from the raw noise level.

In some embodiments, if the result of the subtracting is larger than zero, the result is determined as the noise level. In some embodiments, if the result of the subtracting is less than or equal to zero in some cases, the noise level may be set to a predetermined lower limit, which is used to ensure the value of the noise level for the real physical meaning.

Through the method 500, it is possible to determine a noise level specific for a predefined signal sequence. The noise level is used to determine a detection threshold, which can be used to compare with one or more of the samples to determine whether the samples match with the predefined signal sequence. In addition, the network device 101 may determine a more accurate noise level for each of a plurality of signal sequences that are potentially used, which will further improve the signal detection for the signal sequences.

It would be appreciated that although the noise levels for different predefined signal sequences can be determined in some embodiments of the present disclosure, the noise level may also be directly set as the average value of the noise samples if the network device 101 knows that only one signal sequence is used for generating the samples of the received signal.

According to various embodiments of the present disclosure, the noise level for signal detection can be estimated more accurately. The noise level for different signal sequences may be varied so that it is more likely to detect all the samples for signal transmission from the received signal even if the terminal devices use different signal sequences to generate the transmitting signals.

Figure 6:
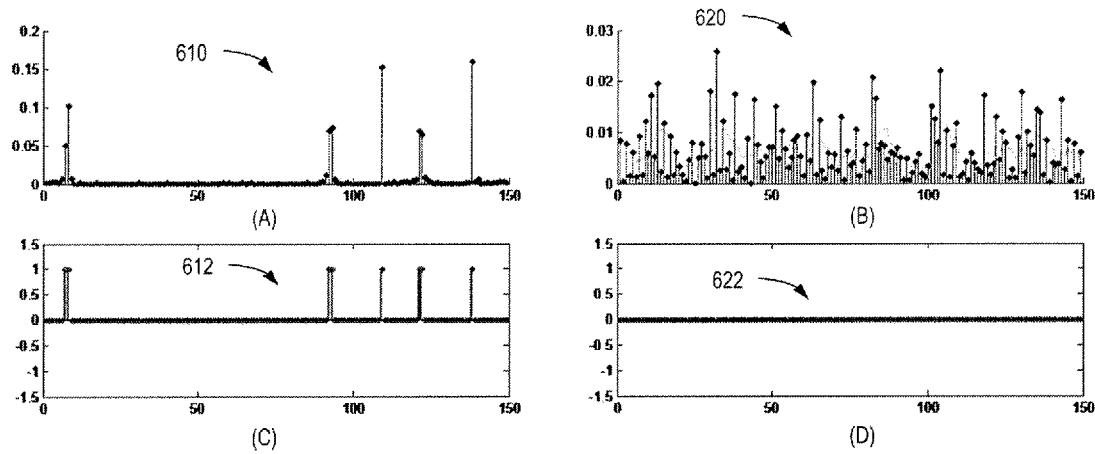
FIG. 6 illustrates an example of peak samples detected for different signal sequences according to embodiments of the present disclosure.

FIGS. 6-10 illustrate the performance of the noise estimate according to embodiments of the present disclosure. FIG. 6 illustrates the peak samples detected for different signal sequences according to embodiments of the present disclosure. In the example of FIG. 6, five PRACH preambles are transmitted on a first predefined signal sequence (i.e., a first root sequence) and an AWGN channel is set. Graph (A) in FIG. 6 shows a sequence of samples 610 transformed on the first predefined signal sequence and graph (B) in FIG. 6 shows a sequence of samples 620 transformed on a second predefined signal sequence. Graph (C) shows the flags of the peak samples 612 detected from the sequence of samples 610, and graph (D) shows the flags of the peak samples 622 detected from the sequence of samples 620. It can be seen that the five samples are accurately detected in the sequence of samples for the first signal sequence, indicating that five PRACH preambles are received on the first predefined signal sequence. As for the second predefined signal sequence, no peak samples will be detected.

Figure 7:
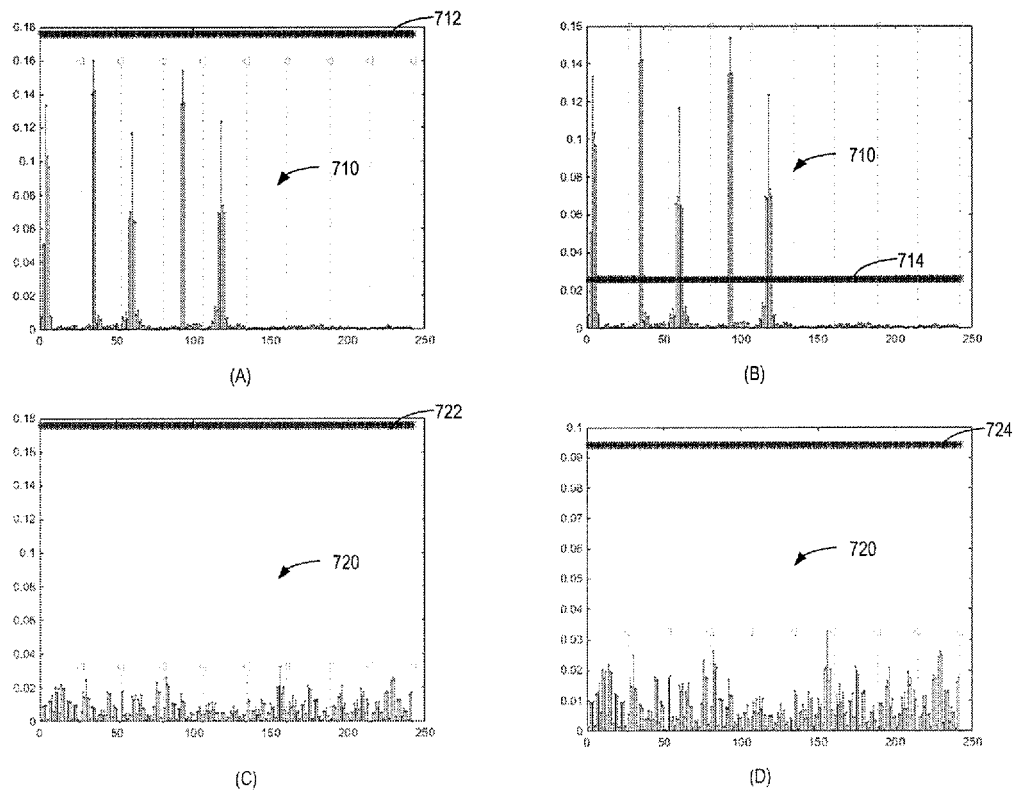
FIGS. 7-8 illustrate examples of comparison of the signal detection according a conventional scheme and embodiments of the present disclosure.

FIG. 7 illustrates an example of comparison of the signal detection according a conventional scheme and embodiments of the present disclosure. In the example of FIG. 7, five PRACH preambles are transmitted on a first predefined signal sequence (i.e., a first root sequence). Graph (A) in FIG. 7 shows that a noise-based threshold (also referred to as a detection threshold) 712 is set for a sequence of samples 710 transformed on the first predefined signal sequence according to the conventional scheme. The threshold 712 is set as a high value because the noise estimate is high. Due to the high noise-based threshold 712, no preambles will be detected on the first predefined signal sequence, which is inaccurate. Graph (B) in FIG. 7 shows a noise-based threshold set 714 set for the sequence of samples 710 transformed on the first predefined signal sequence according to embodiments of the present disclosure. As shown, based on the noise level estimate of the embodiments of the present disclosure, the noise-based threshold 714 is properly set for the first predefined signal sequence such that all of the five peak samples are detected as the PRACH preambles.

Graph (C) in FIG. 7 shows that according to the conventional scheme, a noise-based threshold 722 is used for a sequence of samples 720 transformed on a second predefined signal sequence. No PRACH preamble is detected for the second predefined signal sequence. Graph (D) in FIG. 7 shows a noise-based threshold 724 is specifically set for the sequence of samples 720 transformed on the second predefined signal sequence. As can be seen, the noise-based threshold 724 is higher than the noise-based threshold 714 set for the first predefined signal sequence. The proper noise-based threshold 724 will result in no detection of PRACH preamble on the second predefined signal sequence. It would be noted that in this example, the terminal devices transmit PRACH preambles on only one of the signal sequences, and when observing from any other signal sequence, the samples may have noise only and no inter-sequence interference is detected.

Figure 8:
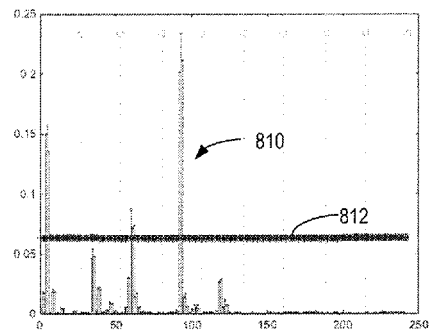
Figure 8:
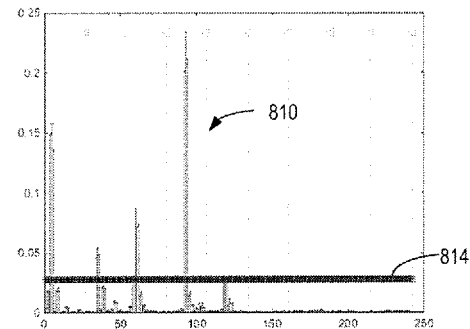
Figure 8:
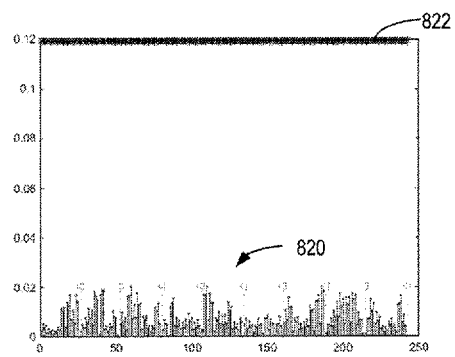
Figure 8:
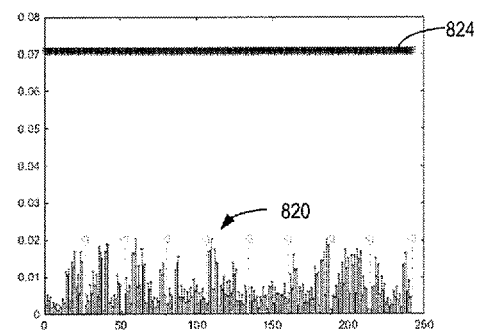

FIG. 8 illustrates another example of comparison of the signal detection according a conventional scheme and embodiments of the present disclosure. In the example of FIG. 8, 5 PRACH preambles are transmitted on the first root sequence, no preambles are present on the other root sequences, and an extended typical urban model (ETU) channel is set. Graph (A) in FIG. 8 shows that a noise-based threshold set 812 is set for a sequence of samples 810 transformed on the first predefined signal sequence according to the conventional scheme. Due to the high noise-based threshold 812, three preambles will be detected on the first predefined signal sequence, which results in miss detection of two other preambles. Graph (B) in FIG. 8 shows a noise-based threshold set 814 set for the sequence of samples 810 transformed on the first predefined signal sequence according to embodiments of the present disclosure. As shown, based on the noise estimate of the embodiments of the present disclosure, the noise-based threshold 814 is properly set for the first predefined signal sequence such that all of the five peak samples are detected as the PRACH preambles.

Graph (C) in FIG. 8 shows that according to the conventional scheme, a noise-based threshold 822 is used for a sequence of samples 820 transformed on a second predefined signal sequence. No PRACH preamble is detected for the second predefined signal sequence. Graph (D) in FIG. 8 shows a noise-based threshold 824 is specifically set for the sequence of samples 820 transformed on the second predefined signal sequence. As can be seen, the noise-based threshold 824 is higher than the noise-based threshold 814 set for the first predefined signal sequence. The proper noise-based threshold 824 will result in no detection of PRACH preamble on the second predefined signal sequence. It would be noted that in this example, due to larger variance of peak samples on the ETU channel caused by a multipath fading effect, more miss-detections are inclined to happen for the conventional scheme and the embodiments of the present disclosure.

Figure 9A:
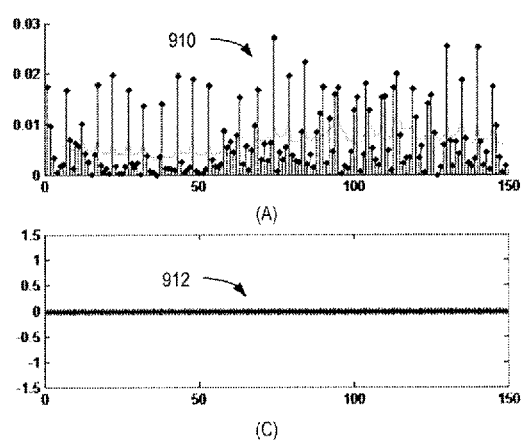
FIG. 9A illustrates an example of peak samples detected for different signal sequences according to embodiments of the present disclosure.
Figure 9A:
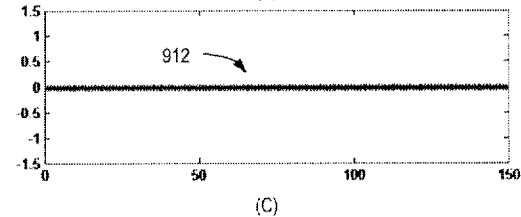
Figure 9A:
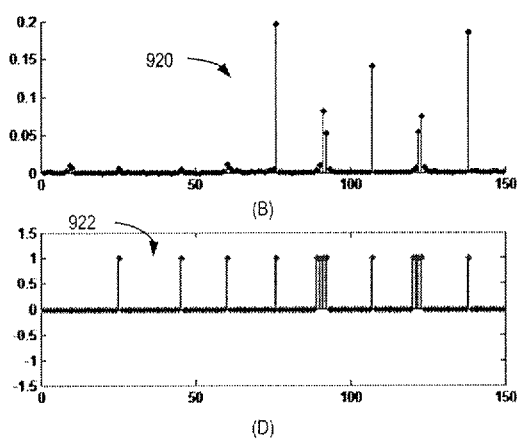
Figure 9A:
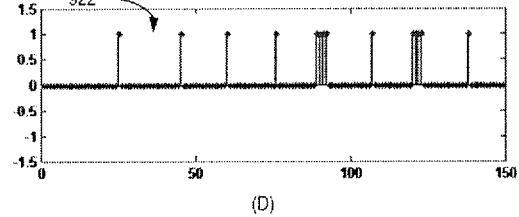

FIG. 9A illustrates the peak samples detected for different signal sequences according to embodiments of the present disclosure. In the example of FIG. 9A, five PRACH preambles are transmitted on a second predefined signal sequence (i.e., a second root sequence). Graph (A) in FIG. 9A shows a sequence of samples 910 transformed on a first predefined signal sequence and graph (B) in FIG. 9A shows a sequence of samples 920 transformed on a second predefined signal sequence. Graph (C) shows the flags of the peak samples 912 detected from the sequence of samples 910, and graph (D) shows the flags of the peak samples 922 detected from the sequence of samples 920. It can be seen that no peak samples are detected for the first signal sequence. In graph (D), five samples are accurately detected in the sequence of samples 920 for the second signal sequence, although some additional peak samples are also detected. However, due to very small power of these tiny peaks, the accuracy of noise power estimation will not be affected at all, and thus the value of detection threshold will be calculated precisely.

Figure 9B:
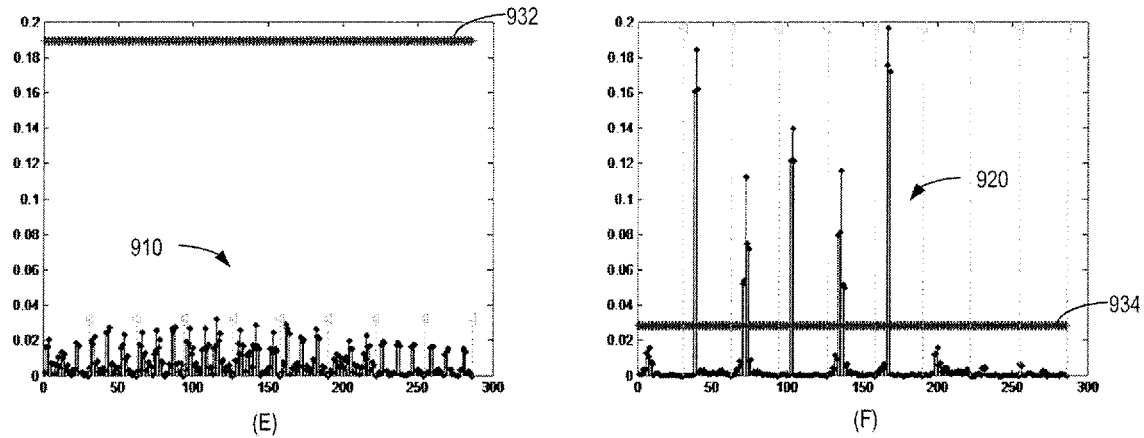
FIG. 9B illustrates an example of a noise level set for the respective sequences of samples in FIG. 9A according to embodiments of the present disclosure.

FIG. 9B illustrates the noise-based thresholds set for the respective sequences of samples 910 and 920 transformed on the first and second signal sequence. Graph (E) shows that a noise-based threshold 932 is properly set for the first signal sequence such that no peak sample are detected from the sequence of samples 910, and graph (F) shows that a noise-based threshold 934 is also properly set for the second signal sequence such that the five accurate peak sample are detected from the sequence of samples 920. It is noted that the number of samples is doubled in graphs (E) and (F) due to interpolation operation on the sequence of sample in graphs (A) and (B).

Figure 10:
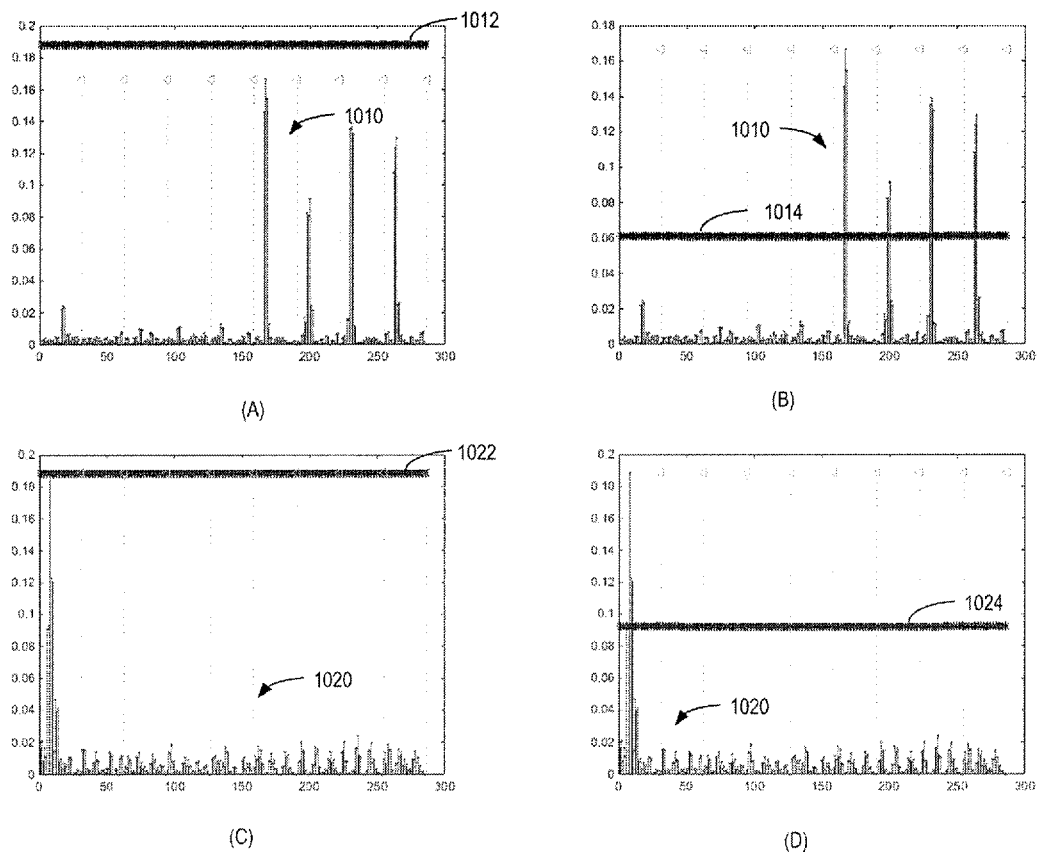
FIG. 10 illustrates a further example of comparison of the signal detection according a conventional scheme and embodiments of the present disclosure.

FIG. 10 illustrates another example of comparison of the signal detection according a conventional scheme and embodiments of the present disclosure. In the example of FIG. 10, both a first predefined signal sequence and a second predefined signal sequence have PRACH preambles present.

Graph (A) in FIG. 10 shows that a noise-based threshold set 1012 is set for a sequence of samples 1010 transformed on the first predefined signal sequence according to the conventional scheme. Due to the high noise-based threshold 1012, no preambles will be detected on the first predefined signal sequence, which is inaccurate. Graph (B) in FIG. 10 shows a noise-based threshold set 1014 set for the sequence of samples 1010 transformed on the first predefined signal sequence according to embodiments of the present disclosure. As shown, the noise-based threshold 1014 is properly set for the first predefined signal sequence such that all of the four peak samples are detected as the PRACH preambles in the first predefined signal sequence.

Graph (C) in FIG. 10 shows that according to the conventional scheme, a noise-based threshold 1022 is used for a sequence of samples 1020 transformed on a second predefined signal sequence. One PRACH preamble is detected for the second predefined signal sequence according to the conventional scheme. Graph (D) in FIG. 10 shows that a noise-based threshold 1024 is specifically set for the sequence of samples 1020 transformed on the second predefined signal sequence. As shown, the noise-based threshold 1024 is properly set for the second predefined signal sequence such that the one peak sample is detected as the PRACH preambles in the second predefined signal sequence.

In some embodiments, an apparatus capable of performing any of the methods 300 to 500 (for example, the network device 101) may comprise means for performing the respective steps of any of the methods 300 to 500. The means may be implemented in any suitable form. For example, the means may be implemented in a circuitry or software module.

In some embodiments, the apparatus comprises: means for transforming a received signal into a plurality of samples based on a predefined signal sequence, the plurality samples being real-valued samples; means for determining respective sample thresholds for the plurality of samples; means for detecting for at least one peak sample and/or at least one valley sample in the plurality of samples by comparing the plurality of samples with the respective sample thresholds; means for determining a noise level based on remaining samples of the plurality of samples other than the at least one detected peak sample and/or the at least one detected valley sample; and means for detecting matching of one of the plurality of samples with the predefined signal sequence based on the noise level.

In some embodiments, the means for determining the respective sample thresholds comprises: for a given sample of the plurality of samples, means for determining the respective sample threshold for the given sample by averaging a predetermined number of samples before the given sample.

In some embodiments, the means for determining the respective sample threshold for the given sample comprises means for in response to a first sample in the predetermined number of samples being detected as a peak sample or a valley sample, smoothing the first sample based on at least one sample before the first sample; and means for determining the respective sample threshold for the given sample by averaging the smoothed first sample and remaining samples of the predetermined number of samples other than the first sample.

In some embodiments, the means for determining the respective sample thresholds further comprises: means for padding copies of a number of other samples among the plurality of samples before the given sample in response to the number of samples among the plurality of samples before the given sample is lower than the predetermined number.

In some embodiments, the means for detecting for the at least one detected peak sample and/or the at least one detected valley sample comprises: for a given sample of the plurality of samples, means for comparing a difference between the given sample and the sample threshold for the given sample with a difference threshold; means for in response to the difference being above the difference threshold, determining whether the given sample is above or below the sample threshold; means for in response to determining that the given sample is above the sample threshold, detecting that the given sample is the peak sample; and means for in response to determining that the sample of the given sample is below the sample threshold, detecting that the given sample is the valley sample.

In some embodiments, the means for detecting for the at least one detected peak sample and/or the at least one detected valley sample further comprises: means for determining a degree of deviation of the predetermined number of samples; and means for determining the difference threshold by multiplying the degree of deviation by a predetermined factor.

In some embodiments, the means for determining the noise level further comprises: means for determining a raw noise level based on the remaining samples; means for determining an inter-sequence interference level between the predefined signal sequence and at least one further predefined signal sequence; and means for determining the noise level by subtracting the raw noise level by a weighted value of the inter-sequence interference level.

In some embodiments, the means for determining the inter-sequence interference level comprises: means for determining a sum of peak samples detected for the at least one further predefined signal sequence; and means for determining the inter-sequence interference level based on the sum.

In some embodiments, the means for determining the inter-sequence interference level based on the sum comprises: means for determining the inter-sequence interference level by dividing the sum by a coefficient for the transforming of the received signal into the plurality of samples.

In some embodiments, the means for detecting matching of one of the plurality of samples with the predefined signal sequence comprises means for determining a detection threshold based on the noise level; and means for detecting whether one of the plurality of samples matches with the predefined signal sequence by comparing the sample with the detection threshold.

In some embodiments, the means for transforming the received signal into the plurality of samples comprises means for transforming the received signal into a plurality of power delay profile (PDP) samples.

In some embodiments, the predefined signal sequence comprises a Zadoff-Chu (ZC) sequence.

Figure 11:
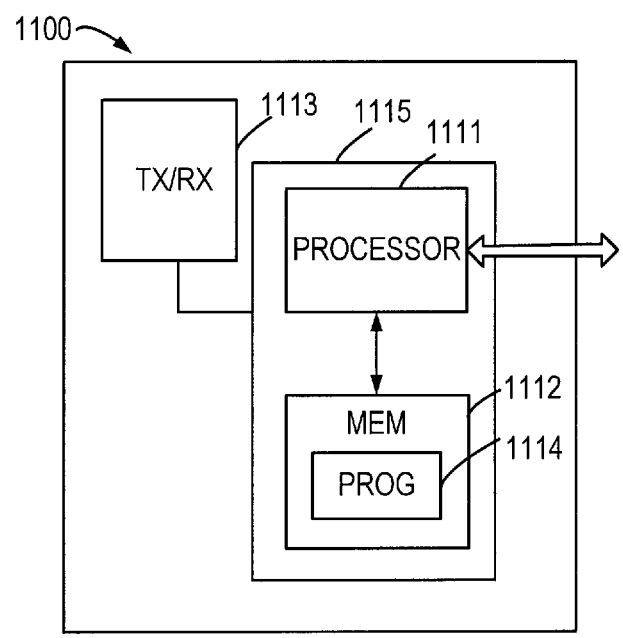
FIG. 11 illustrates a simplified block diagram of a device that is suitable for implementing embodiments of the present disclosure.

FIG. 11 illustrates a simplified block diagram of an apparatus 1100 that may be embodied as or comprised in a receiver device, for example, a terminal device 102 or a network device 101 shown in FIG. 1.

The apparatus 1100 comprises at least one processor 1111, such as a data processor (DP) and at least one memory (MEM) 1112 coupled to the processor 1111. The apparatus 1110 may further include a transmitter TX and receiver RX 1113 coupled to the processor 1111, which may be operable to communicatively connect to other apparatuses. The MEM 1112 stores a program or computer program code 1114. The at least one memory 1112 and the computer program code 1114 are configured to, with the at least one processor 1111, cause the apparatus 1100 at least to perform in accordance with embodiments of the present disclosure, for example any of methods 300 to 500.

A combination of the at least one processor 1111 and the at least one MEM 1112 may form processing means 1115 configured to implement various embodiments of the present disclosure.

Various embodiments of the present disclosure may be implemented by computer program executable by the processor 1111, software, firmware, hardware or in a combination thereof.

The MEM 1112 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 1111 may be of any type suitable to the local technical environment, and may include one or more of general purpose computers, special purpose computers, microprocessors, digital signal processors (DSPs) and processors based on multicore processor architecture, as non-limiting examples.

Although some of the above descriptions on the GD based signal detection and staged signal detection are made in the context of a wireless communication system shown in FIG. 1, it should not be construed as limiting the spirit and scope of the present disclosure. The principle and concept of the present disclosure may be more generally applicable to other scenarios.

In addition, the present disclosure may also provide a carrier containing the computer program as mentioned above (e.g., computer instructions/grogram code 1114 in FIG. 11). The carrier includes a computer readable storage medium and a transmission medium. The computer readable storage medium may include, for example, an optical compact disk or an electronic memory device like a RAM (random access memory), a ROM (read only memory), Flash memory, magnetic tape, CD-ROM, DVD, Blue-ray disc and the like. The transmission medium may include, for example, electrical, optical, radio, acoustical or other form of propagated signals, such as carrier waves, infrared signals, and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300, 400 and 500 as described above with reference to FIGS. 3-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

For the purpose of the present invention as described herein above, it should be noted that, method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

What is claimed is:
1. A method, comprising:
transforming a received signal into a plurality of samples based on a predefined signal sequence, the plurality of samples being real-valued samples;
determining respective sample thresholds for the plurality of samples;

detecting for at least one peak sample or at least one valley sample in the plurality of samples by comparing the plurality of samples with the respective sample thresholds;
determining a noise level based on remaining samples of the plurality of samples other than the at least one detected peak sample or the at least one detected valley sample; and
detecting matching of one of the plurality of samples with the predefined signal sequence based on the noise level, wherein determining the respective sample thresholds comprises, for a given sample of the plurality of samples:
determining the respective sample threshold for the given sample by averaging a predetermined number of samples before the given sample, said determining comprising
in response to a first sample in the predetermined number of samples being detected as a peak sample or a valley sample, smoothing the first sample based on at least one sample before the first sample;
determining the respective sample threshold for the given sample by averaging the smoothed first sample and remaining samples of the predetermined number of samples other than the first sample; and
in response to the number of samples among the plurality of samples before the given sample is lower than the predetermined number, padding copies of a number of other samples among the plurality of samples before the given sample.

2. The method of claim 1, wherein detecting matching of one of the plurality of samples with the predefined signal sequence comprises:
determining a detection threshold based on the noise level; and
detecting whether one of the plurality of samples matches with the predefined signal sequence by comparing the sample with the detection threshold.

3. The method of claim 1, wherein transforming the received signal into the plurality of samples comprises:
transforming the received signal into a plurality of power delay profile (PDP) samples.

4. The method of claim 1, wherein the predefined signal sequence comprises a Zadoff-Chu (ZC) sequence.

5. A non-transitory computer readable storage medium comprising a computer program thereon, the computer program, when executed by a processor, causing the processor to perform the method of claim 1.

6. A method, comprising:
transforming a received signal into a plurality of samples based on a predefined signal sequence, the plurality samples being real-valued samples;
determining respective sample thresholds for the plurality of samples;
detecting for at least one peak sample or at least one valley sample in the plurality of samples by comparing the plurality of samples with the respective sample thresholds;
determining a noise level based on remaining samples of the plurality of samples other than the at least one detected peak sample or the at least one detected valley sample; and
detecting matching of one of the plurality of samples with the predefined signal sequence based on the noise level, wherein detecting for at least one peak sample or at least one valley sample comprises, for a given sample of the plurality of samples:

comparing a difference between the given sample and the sample threshold for the given sample with a difference threshold;
in response to the difference being above the difference threshold, determining whether the given sample is above or below the sample threshold;
in response to determining that the given sample is above the sample threshold, detecting that the given sample is the peak sample;
in response to determining that the sample of the given sample is below the sample threshold, detecting that the given sample is the valley sample,
wherein the detecting for at least one peak sample or at least one valley sample further comprises
determining a degree of deviation of the predetermined number of samples; and
determining the difference threshold by multiplying the degree of deviation by a predetermined factor.

7. A non-transitory computer readable storage medium which tangibly stores a computer program and comprising the computer program, the computer program, when executed by a processor, causing the processor to perform the method of claim 6.

8. A method, comprising:
transforming a received signal into a plurality of samples based on a predefined signal sequence, the plurality samples being real-valued samples;
determining respective sample thresholds for the plurality of samples;
detecting for at least one peak sample or at least one valley sample in the plurality of samples by comparing the plurality of samples with the respective sample thresholds;
determining a noise level based on remaining samples of the plurality of samples other than the at least one detected peak sample or the at least one detected valley sample; and
detecting matching of one of the plurality of samples with the predefined signal sequence based on the noise level, wherein determining the noise level further comprises:
determining a raw noise level based on the remaining samples;
determining an inter-sequence interference level between the predefined signal sequence and at least one further predefined signal sequence; and
determining the noise level by subtracting the raw noise level by a weighted value of the inter-sequence interference level.

9. The method of claim 8, wherein determining the inter-sequence interference level comprises:
determining a sum of peak samples detected for the at least one further predefined signal sequence; and
determining the inter-sequence interference level based on the sum.

10. The method of claim 8, wherein determining the inter-sequence interference level based on the sum comprises:
determining the inter-sequence interference level by dividing the sum by a coefficient for the transforming of the received signal into the plurality of samples.

11. A device, comprising:
at least one processor; and
at least one memory including computer program code;
the at least one memory and the computer program code configured to, with the at least one processor, cause the device to perform:

transforming a received signal into a plurality of samples based on a predefined signal sequence, the plurality samples being real-valued samples;
determining respective sample thresholds for the plurality of samples;
detecting for at least one peak sample or at least one valley sample in the plurality of samples by comparing the plurality of samples with the respective sample thresholds;
determining a noise level based on remaining samples of the plurality of samples other than the at least one detected peak sample or the at least one detected valley sample; and
detecting matching of one of the plurality of samples with the predefined signal sequence based on the noise level, wherein determining the respective sample thresholds comprises, for a given sample of the plurality of samples:
determining the respective sample threshold for the given sample by averaging a predetermined number of samples before the given sample;
in response to a first sample in the predetermined number of samples being detected as a peak sample or a valley sample, smoothing the first sample based on at least one sample before the first sample;
determining the respective sample threshold for the given sample by averaging the smoothed first sample and remaining samples of the predetermined number of samples other than the first sample; and
in response to the number of samples among the plurality of samples before the given sample is lower than the predetermined number, padding copies of a number of other samples among the plurality of samples before the given sample.

12. The device of claim 11, wherein detecting matching of one of the plurality of samples with the predefined signal sequence comprises:
determining a detection threshold based on the noise level; and
detecting whether one of the plurality of samples matches with the predefined signal sequence by comparing the sample with the detection threshold.

13. The device of claim 11, wherein transforming the received signal into the plurality of samples comprises:
transforming the received signal into a plurality of power delay profile (PDP) samples.

14. The device of claim 11, wherein the predefined signal sequence comprises a Zadoff-Chu (ZC) sequence.

15. A device, comprising:
at least one processor; and
at least one memory including computer program code;
the at least one memory and the computer program code configured to, with the at least one processor, cause the device to perform:
transforming a received signal into a plurality of samples based on a predefined signal sequence, the plurality samples being real-valued samples;
determining respective sample thresholds for the plurality of samples;
detecting for at least one peak sample or at least one valley sample in the plurality of samples by comparing the plurality of samples with the respective sample thresholds;
determining a noise level based on remaining samples of the plurality of samples other than the at least one detected peak sample or the at least one detected valley sample; and
detecting matching of one of the plurality of samples with the predefined signal sequence based on the noise level, wherein detecting for at least one peak sample or at least one valley sample comprises: for a given sample of the plurality of samples,
comparing a difference between the given sample and the sample threshold for the given sample with a difference threshold;
in response to the difference being above the difference threshold, determining whether the given sample is above or below the sample threshold;
in response to determining that the given sample is above the sample threshold, detecting that the given sample is the peak sample;
in response to determining that the sample of the given sample is below the sample threshold, detecting that the given sample is the valley sample;
determining a degree of deviation of the predetermined number of samples; and
determining the difference threshold by multiplying the degree of deviation by a predetermined factor.

16. A device, comprising:
at least one processor; and
at least one memory including computer program code;
the at least one memory and the computer program code configured to, with the at least one processor, cause the device to perform:
transforming a received signal into a plurality of samples based on a predefined signal sequence, the plurality samples being real-valued samples;
determining respective sample thresholds for the plurality of samples;
detecting for at least one peak sample or at least one valley sample in the plurality of samples by comparing the plurality of samples with the respective sample thresholds;
determining a noise level based on remaining samples of the plurality of samples other than the at least one detected peak sample or the at least one detected valley sample; and
detecting matching of one of the plurality of samples with the predefined signal sequence based on the noise level, wherein determining the noise level further comprises:
determining a raw noise level based on the remaining samples;
determining an inter-sequence interference level between the predefined signal sequence and at least one further predefined signal sequence; and
determining the noise level by subtracting the raw noise level by a weighted value of the inter-sequence interference level.

17. The device of claim 16, wherein determining the inter-sequence interference level comprises:
determining a sum of peak samples detected for the at least one further predefined signal sequence; and
determining the inter-sequence interference level based on the sum.

18. The device of claim 16, wherein determining the inter-sequence interference level based on the sum comprises:
determining the inter-sequence interference level by dividing the sum by a coefficient for the transforming of the received signal into the plurality of samples.

* * * * *